(12) United States Patent
Metz et al.

(10) Patent No.: US 8,750,476 B2
(45) Date of Patent: *Jun. 10, 2014

(54) MEDIA OPTIMIZATION USING TRANSCRIPTION ANALYSIS

(71) Applicant: Felix Calls, LLC, New York, NY (US)

(72) Inventors: Brent D. Metz, New York, NY (US); Sean MacIsaac, New York, NY (US); Kevin Caffrey, New York, NY (US); Ilia Mirkin, New York, NY (US)

(73) Assignee: Felix Calls, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,428

(22) Filed: Jun. 28, 2013

(65) Prior Publication Data

US 2013/0287194 A1   Oct. 31, 2013

Related U.S. Application Data

(63) Continuation of application No. 12/732,602, filed on Mar. 26, 2010, now Pat. No. 8,503,635.

(60) Provisional application No. 61/241,174, filed on Sep. 10, 2009.

(51) Int. Cl.
*H04M 15/00* (2006.01)
*G06F 15/18* (2006.01)

(52) U.S. Cl.
USPC ........................................ 379/121.02; 705/7

(58) Field of Classification Search
CPC ...... H04M 15/51; G06Q 10/063; G06Q 30/02
USPC .................... 379/88.14, 93.05, 100.3, 142.14
See application file for complete search history.

(56) References Cited

U.S. PATENT DOCUMENTS

| | | | |
|---|---|---|---|
| 7,933,899 B2 * | 4/2011 | Valz | 707/723 |
| 8,407,048 B2 * | 3/2013 | Rogers | 704/235 |
| 8,498,872 B2 * | 7/2013 | White et al. | 704/270.1 |
| 8,644,463 B2 * | 2/2014 | Demmitt et al. | 379/88.14 |
| 2008/0089500 A1 | 4/2008 | Dolan et al. | |
| 2008/0170676 A1 * | 7/2008 | Douma et al. | 379/114.13 |
| 2008/0249991 A1 * | 10/2008 | Valz | 707/3 |
| 2008/0310614 A1 * | 12/2008 | Ward | 379/221.14 |
| 2009/0124272 A1 * | 5/2009 | White et al. | 455/466 |
| 2009/0141875 A1 * | 6/2009 | Demmitt et al. | 379/88.14 |
| 2010/0161327 A1 | 6/2010 | Chandra et al. | |
| 2011/0131042 A1 | 6/2011 | Nagatomo | |

* cited by examiner

*Primary Examiner* — Fan Tsang
*Assistant Examiner* — Solomon Bezuayehu
(74) *Attorney, Agent, or Firm* — Lowenstein Sandler LLP (57) ABSTRACT

A system and method for optimizing the price of a call to a business and the placement of a business' information within an ad buy on a Web page are disclosed. A call is received by a client from a potential consumer of a product. The call is transcribed into a text call stream on both the consumer and the client sides of the call. Patterns are extracted from the call. The patterns extracted may be applied against patterns relevant to the client. Patterns relevant to the client may be tied to certain goals of the business of the client that indicate successful business transactions between the consumer and the client or that indicate a service provide by the client. Extracted patterns may be used for targeting of advertisements based on a call containing patterns relevant to the client.

22 Claims, 7 Drawing Sheets

| Client ID | Industry | Name | Phone Number | Zip Code | Baseline Price Per Call |
|---|---|---|---|---|---|
| 1001 | Vet | Sample Vet | 234-567-8901 | 10023 | 20 |
| 1002 | Gym | Sample Gym | 242-242-1312 | 53202 | 20 |
| 1003 | Vet | Competitor Vet | 703-750-8300 | 10019 | 20 |

Table 1 - Client Table - FIG. 3A

| Ad Buy ID | Name |
|---|---|
| 2001 | Google - "Animal Boarding" |
| 2002 | Google - "Pet Vaccination" |

Table 2 - Ad Buy Table - FIG. 3B

| Pattern ID | Name | (Optional) Industry | Success Pattern? |
|---|---|---|---|
| 3001 | Appointment Negotiation | | TRUE |
| 3002 | Boarding | Vet | |
| 3002 | Boarding | Vet | |
| 3003 | Vaccines | Vet | |
| 3004 | Rabies | Vet | |

Table 3 - Pattern Table - FIG. 3C

| Client ID | Pattern ID | Charge Multiplier | Charge Addition | Requirement Flag? | Exclusion Flag? |
|---|---|---|---|---|---|
| 1001 | 3001 | | 2 | | |
| 1001 | 3003 | 1.5 | | | |
| 1001 | 3004 | | | | TRUE |

Table 4 - Client Pattern Billing Table - FIG. 3D

| Ad Buy | Pattern ID | % Of Calls Containing Pattern | # Of Calls Containing Pattern | Avg Price of Calls |
|---|---|---|---|---|
| 2001 | 3001 | 25% | 10 | $7 |
| 2001 | 3002 | 50% | 20 | $4 |
| 2001 | 3005 | 50% | 20 | $5 |

Table 5  - Ad Buy to Spoken Pattern Statistic Table - FIG. 3E

| Industry | Client ID | Pattern ID | # of calls w/ pattern | % of calls w/ pattern | % of calls w/ pattern and success | Avg Price of Matching Calls |
|---|---|---|---|---|---|---|
| Vet | | 3002 | 20 | 10% | 20% | $5 |
| Vet | 1001 | 3002 | 10 | 10% | 50% | $12.50 |
| Vet | 1003 | 3002 | 10 | 10% | 30% | $7.50 |

Table 6  - Client Spoken Pattern Statistic Table - FIG. 3F

| Call ID | Consumer Phone Number | Client ID | Final Charge | Patterns Matched |
|---|---|---|---|---|
| 4001 | 703-620-0123 | 1001 | $22 | 3001 |
| 4001 | 703-581-3011 | 1001 | $0 | 3004 and 3001 |
| 4001 | 212-558-1434 | 1001 | $30 | 3003 |

Table 7  - Call Table - FIG. 3G

MEDIA OPTIMIZATION USING TRANSCRIPTION ANALYSIS

CROSS-REFERENCE TO RELATED APPLICATIONS

This application is a continuation of U.S. patent application Ser. No. 12/732,602, filed on Mar. 26, 2010, which claims the benefit of U.S. provisional patent application No. 61/241,174 filed Sep. 10, 2009, the disclosures of which are incorporated herein by reference in their entirety.

FIELD OF THE INVENTION

The present invention relates generally to telecommunications, and more particularly, to a method and system for optimizing the price of a call to a business and the placement of Web ads for the business by matching patterns indicating a level of relevance to the business in transcriptions of calls between consumers and the business.

BACKGROUND OF THE INVENTION

A business (hereinafter, the "client(s)") may rely heavily on services rendered via telecommunications. The business/client desires to make as many high qualities calls with customers (hereinafter, the "consumer(s)"), such as an inquiry about a particular service. At the same time, the client seeks to mitigate risk and model their expected return on investment (ROI). While many telecommunications service providers offer their telephone clients "pay per call" billing models, whereby the client only pays when a client receives a phone call from a potential consumer, the "pay per call" billing model has several disadvantages.

Telecommunications service providers may provide a unique telephone number to a client to track consumer usage. Unfortunately, a call may be received by a client from someone who misdialed or otherwise accidently called the tracked telephone number. Some telecommunications service providers try to overcome this problem by charging clients based on a set of billing rules, such as not billing for calls lasting under 12 seconds in length. Such billing rules may evaluate properties such as call length, but such services based on billing rules do not attempt to analyze the call content itself. While services based on billing rules may remove some undesirable calls from being billed to a client, the billing rules do not account for variable value in the calls received by a client. Services based on billing rules may fail to remove calls from undesirable sources, such as telemarketers. Further, some consumers may call for maintenance of a car part, while other consumers may call to have the car part replaced, the latter being more valuable to the client. Additionally, services based on billing rules generally do not allow a client to be billed for different patterns observed on calls, thereby potentially misaligning a client's ROI with purchases the client made for advertising their tracked telephone number, for example, on certain Web sites (hereinafter, an "ad buy").

Accordingly, what would be desirable, but has not yet been provided, is a method and system for optimizing ad buys by comparing patterns matched in a transcription of a telephone call between a client and a consumer with patterns that are relevant to the client. Such patterns are correlated to calls with variable rates that depend on a client's willingness to pay more for calls having more desirable content.

SUMMARY OF THE INVENTION

The above-described problems are addressed and a technical solution is achieved in the art by providing a method and system for optimizing the price of a call to a business and the placement of a business' information within an ad buy on a Web page. A call is received by a client from a potential consumer of a product. The call is transcribed into a text call stream on both the consumer and the client sides of the call. As used herein, the term "client" may refer to any person or organization that may employ the method and/or system of the present invention, which may include, but is not limited to, an individual, a non-profit organization such as a university, and a for-profit business. As used herein, the term "consumer" may refer to any person or organization that may call into the system using the method of the present invention, which may include, but is not limited to, an individual, a non-profit organization such as a university, and a for-profit business. Patterns are extracted from the call. The patterns extracted may be applied against patterns relevant to the client. Patterns relevant to the client may be tied to certain goals of the business of the client that indicate successful business transactions between the consumer and the client or services provided by the client. Extracted patterns may be used to adjust the price of the call based on the client's willingness to pay for a call containing a high degree of significant patterns. The price charged for the call may be based on a multiplication factor and/or a flat rate additional charge.

Optionally, if a client advertises on a Web site, the placement or prominence of that client's information in an ad buy may be raised or otherwise made more visible to a customer that views an ad buy for the services rendered by the client based on the valuable extracted patterns. Optionally, a client associated with relevant patterns may trigger the purchase of more ad buys for the client on possibly more Web sites.

The present invention is not restricted to the placement of ad buys on Web pages. Certain embodiments of the present invention are applicable to the more general case of ad buys that are located anywhere a tracked phone number may be placed. For example, ad buys may be placed in text messages on cell phones or inserted into chat streams in an instant messaging service. Even a billboard or non-online media are applicable.

According to an embodiment of the present invention, a method for optimizing the price a client will pay for receiving a call from a consumer is disclosed, comprising the steps of: receiving a call from a consumer; transcribing the call; extracting at least one pattern from the transcribed call; applying the at least one pattern from the transcribed call against at least one pattern relevant to the client; and adjusting the price of the call to the client based on the at least one pattern relevant to the client. Adjusting the price of the call may be further based on the client's willingness to pay for a call based on the at least one pattern relevant to the client. The at least one pattern relevant to the client may be tied to the client's business goals. The at least one pattern relevant to the client may be based on successful business transactions between the consumer and the client or a service provided by the client. Adjusting the price of the call may be further based on the value of the at least one pattern relevant to the client to the client's business goals. The price of a call may be adjusted by means of at least one of a multiplication factor and a flat rate additional charge.

According to an embodiment of the present invention, the at least one pattern relevant to the client is one of common to all calls, common to the type of service of the client, and customized to a particular client. The at least one pattern relevant to the client may be represented by at least one of a text strings, a regular expression, and the result of analysis of the context of the at least one pattern in the transcribed call.

The at least one pattern relevant to the client may be extracted using term frequency analysis in an off-line learning step.

According to an embodiment of the present invention, at least one of the placement and prominence of information pertaining to a client on a Web page is made more visible to the consumer viewing the information based on the at least one pattern relevant to the client. The information pertaining to the client in an ad buy is listed higher in the ad buy according to a weighting that takes into account the probability of occurrence of the at least one pattern relevant to the client having been spoken during a call. Ordering of a display of client in an ad buy may be determined by a scoring algorithm. The scoring algorithm may based on a learning system that uses revenue and percent of calls that have a pattern match or which mixes the pattern relevant to the client with distance from the consumer.

According to an embodiment of the present invention, applying the at least one pattern from the transcribed call against at least one pattern relevant to the client triggers the purchase of at least one ad buy for the client. The at least one ad buy may be located wherever a tracked telephone number is placed. The at least one ad buy may be placed on at least one of a Web page, a text messages on a cell phone, a portion of a chat streams in an instant messaging service, and non-online media.

BRIEF DESCRIPTION OF THE DRAWINGS

The present invention will be more readily understood from the detailed description of an exemplary embodiment presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
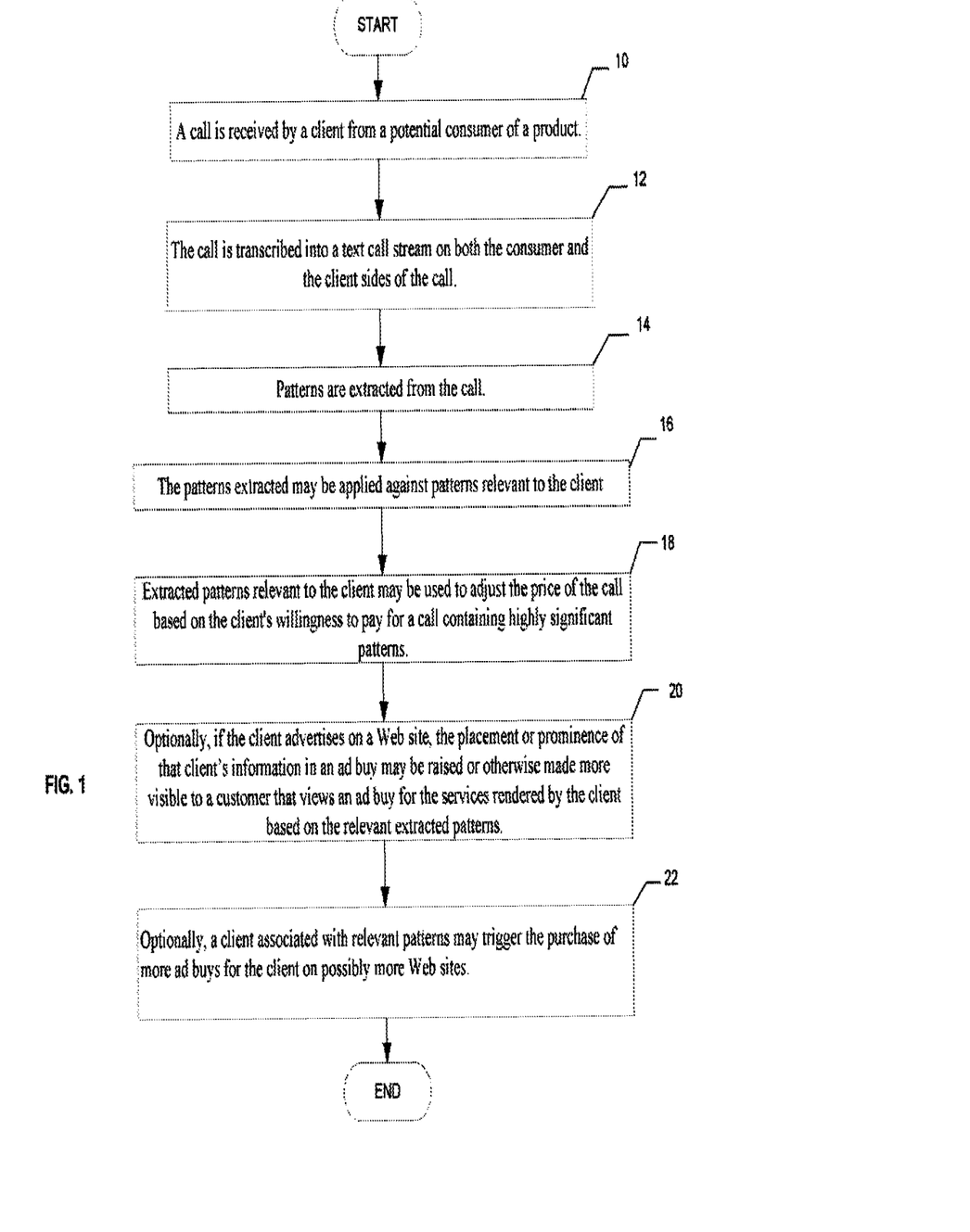
FIG. 1 is a process flow diagram illustrating exemplary steps for optimizing the price of a call to a business and the placement of a business' information within an ad buy on a Web page, according to an embodiment of the present invention.

FIG. 1 is a process flow diagram illustrating exemplary steps for optimizing the price of a call to a business and the placement of a business' information within an ad buy on a Web page, according to an embodiment of the present invention. At step 10, a call is received by a client from a potential consumer of a product. At step 12, the call is transcribed into a text call stream on both the consumer and the client sides of the call. The audio waveform of a call stream is stored, with one (e.g., the left) channel being associated with the consumer and the other (e.g., the right) channel being associated with the client. Each of the channels is transcribed separately with timing data stored. At step 14, patterns are extracted from the call. The specific patterns may be common to all calls, such as "I'd like to make an appointment," common to the type of service of the client, such as the pattern "euthanasia," which may be relevant to veterinarians, or even customized to a particular client. The patterns may be represented by simple text strings, regular expressions, or may be subject to more complex algorithmic analysis of the context of the transcription. Relevant patterns may be identified before any calls are received by a subject matter expert that may consult the client or determine patterns on their own, or by software that that examines transcriptions of calls received by clients that extracts patterns using term frequency analysis in an off-line learning step. As a result of the pattern matching step, the identity of the consumer may be determined. As part of the identification process, non-consumer fraudulent call data or wrong number telephone calls are automatically filtered out of the call.

At step 16, the patterns extracted in step 14 are applied against patterns relevant to the client. Patterns relevant to the client may be tied to certain goals of the business of the client, such as an inquiry about a service rendered by the client, e.g., "vaccines" plus "making an appointment to receive a vaccine" for a client that is a veterinarian. Relevant patterns may be identified before any calls are received by a subject matter expert that may consult the client or determine patterns on their own, or by software that examines transcriptions of calls received by clients that extracts patterns using term frequency analysis in an off-line learning step. At step 18, valuable extracted patterns are used to adjust the price of the call based on the client's willingness to pay for a call containing significant patterns. The price charged for the call may be based on a multiplication factor and/or a flat rate additional charge.

At an optional step 20, if the client advertises on a Web site, the placement or prominence of that client's information may be raised or otherwise made more visible to a future customer that views an ad for the services rendered by the client based on the valuable extracted patterns. For example, a link on a Web site may advertise veterinary service, with a click on the link directing the customer to another Web page listing veterinarians by name, address, and telephone number. The order of the listed veterinarians may be altered such that a veterinarian that has received one or more calls that have relevant patterns may be raised higher in the list or otherwise displayed more prominently (e.g., the listing is in a larger font or a "brighter" color font). At an optional step 22, a client receiving relevant patterns may trigger the purchase of more ad buys for the client on possibly more Web sites. The execution of optional steps 20 and 22 may result in a positive feedback loop that benefits the client. If pattern analysis indicates that vaccine calls make more money, then identification information of the client in Web ads becomes more prominent and more ad buys are made on behalf of the client. The prominence of the client in a Web ad may lead to more successful calls/patterns, which leads to more prominent ads and ad buys, etc.

Figure 2:
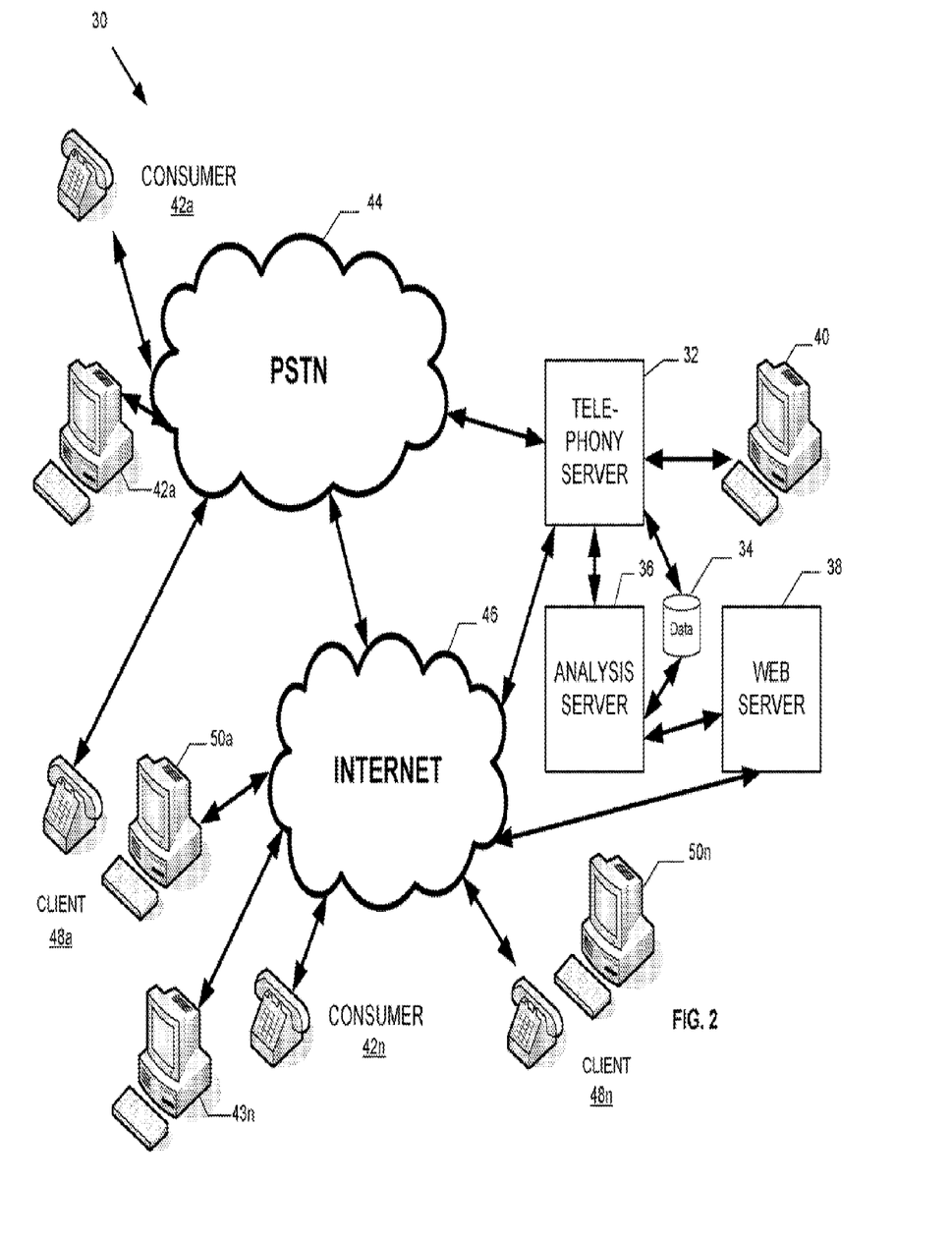
FIG. 2 depicts a system for optimizing the price of a call to a business and the placement of a business' information within an ad buy on a Web page, according to an embodiment of the present invention.

FIG. 2 depicts a system 30 for optimizing the price of a call to a business and the placement of a business' information within an ad buy on a Web page, according to an embodiment of the present invention. The system 30 includes a telephony server 32, the telephony server 32 being associated with a data store 34, an analysis server 36, a Web server 38, and a data entry terminal/computer 40. The telephony server 32 may be a traditional private branch exchange (PBX) or a voice-over-IP (VOIP) server. The telephony server 32 is configured for intercepting calls from consumers 42a-42n via the public switched telephone network (PSTN) 44, the Internet 46, or both; for completing those calls to clients 48a-48n over the PSTN 44, the Internet 46, or both; for bridging calls between the consumers 42a-42n and the clients 48a-48n, for recording telephone calls received by the clients 48a-48n; and for logging the recorded calls and the caller IDs to the data store 34.

The analysis server 36 is configured for maintaining a database of the clients 48a-48n (See table 1 hereinbelow); for transcribing received telephone calls into voice-recognized text call streams; for tracking and matching consumers to clients; for analyzing and extracting patterns within and among the call streams to produce key words or phrases that are relevant to a client 48a-48n; for adjusting the price of a call to a client 48a-48n as determined by tables to be described hereinbelow; for providing a media tracking system that collects information from Web site visitors (i.e., the consumers 42a-42n visiting Web sites through terminals 43a-43n) that click on ad buys and receive search results that display the clients 48a-48n in order of receiving more relevant patterns from the database of the clients 48a-48n of Table 1, possibly restricted to a local geographic area; for providing code for matching a usable percentage of a set of client calls back to consumer that visit a specific ad buy (Web site ad); and for determining whether to increase or decrease the number of ad buys for clients 48a-48n depending on the number of detected relevant patterns.

The data store 34 stores a number of tables needed for analysis and for storing and the retrieval of call streams to be described in connection with FIGS. 3A-3G corresponding to Tables 1-7 hereinbelow. A subject matter expert may enter typical key word patterns to be extracted from calls manually via the data entry terminal/computer 40. Alternatively, key word patterns may be provided by third party software. The Web server 38 is configured for presenting call patterns of calls received from the consumers 48a-48n to the clients 48a-48n in the form of formatted call logs, and for formatting and displaying Web pages containing ads pertaining to the clients 48a-48n at one or more terminals/personal computer/workstations 43a-43n used by the consumers 42a-42n.

The telephony server 32, the analysis server 36, and the Web server 38 may each comprise at least one processor, which may be included in a personal computer, a work station, a mainframe computer, or any other device having enough processing power for carrying out the present invention. Alternatively, one or more of the servers/computers 32, 36, 38 may be aggregated into one or more processors running on a single personal computer, a work station, or a mainframe computer.

Each of the clients 48a-48n may have a voice line or VOIP telephone 48a-48n configured to receive inbound calls via the telephony server 32. Each of the clients 48a-48n may have one or more terminals/personal computer/workstations 50a-50n for logging into the Web server 38 in order to view formatted call logs. Each of the consumers 42a-42n may have one or more terminals/personal computer/workstations 43a-43n for viewing Web sites over the Internet 46 that may receive ad buys of the clients 48a-48n via the Web server 38. The client 48a may communicate with a consumers 42a over the PSTN 44 if the telephony server 32 is a PBX, the client 48a have a voice line phone, and the consumer 48a has a voice line phone; over the Internet 46 and the PSTN 44 if the telephony server 32 is a VOIP server, the client 48n has a VOIP phone, and the consumer 42a has a voice line phone; and, over the Internet 46 if the telephony server 32 is a VOIP server and the client 48n has a VOW phone.

Figure 3A:
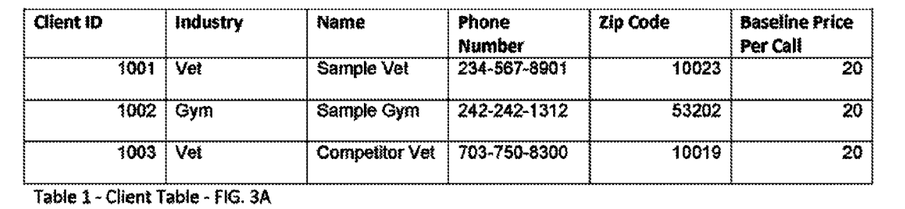
FIGS. 3A-3G show examples of tables located in the data store of the system of FIG. 2 for processing calls, patterns, call pricing, and ad buys, according to an embodiment of the present invention.

FIGS. 3A-3G show examples of tables (i.e., Tables 1-7, respectively) located in the data store 34 for processing calls, relevant patterns, success patterns, call pricing, and ad buys, according to an embodiment of the present invention. In FIG. 3A, a client Table 1 includes a plurality of records 60. Each of the records 60 corresponds to one of the clients 48a-48n. Each of the records 60 contains fields for at least a numerical client ID 62, the industry 64 associated with a client 48a-48n, the name 66 of the client 48a-48n, the telephone number 68 associated with the client 48a-48n, the zip code 70 of the location of the business address of the client 48a-48n, and base line price per call field 72 assigned to the calls received by the client 48a-48n. It should be noted that the same client may have more than one record 60 corresponding to different telephone numbers 68.

Figure 3B:
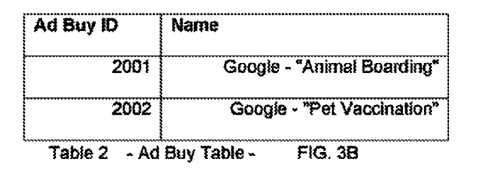

In FIG. 3B, an ad buy Table 2 includes a plurality of records 73. Each of the records 73 contains fields for at least a numerical ad buy ID 74 and an ad buy name 76.

Figure 3C:
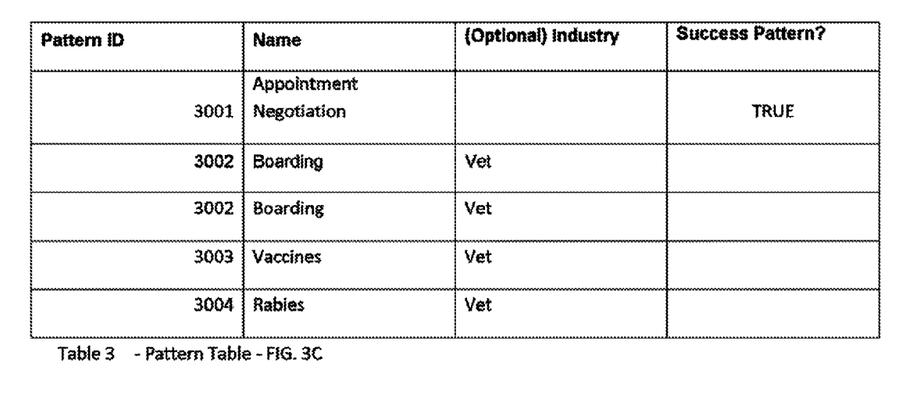

In FIG. 3C, a pattern Table 3 lists all of the predefined patterns that are tracking in incoming telephone calls to the clients 48a-48n from the consumers 42a-42n populated by a subject matter expert at the data entry terminal/computer 40 or determined automatically by analyzing previous calls by third party software. Each of the records 78 of Table 3 contains fields for a numerical pattern ID 80, the name of the pattern, the pattern string itself, or a regular expression 82, an optional industry field 84 associated with a type of pattern, and a success pattern field 86 that indicates that the pattern of field 82 is considered an indication of a pattern relevant to the client. A success flag is set to TRUE if a subject matter expert or third party software, after possibly consulting with a client 48a-48n, determines that the pattern relates to a positive outcome of a call. Success patterns may be either global or based on industry type in the industry field 84. For example, veterinary customers may consider the word "appointment" in the pattern field 82 to be a "success pattern." Other examples may include a pattern indicating payment information or a discussion of directions to the client's facility or the consumer's house.

Figure 3D:
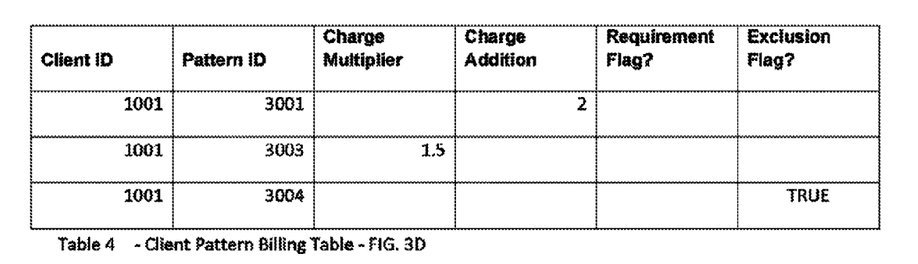

In FIG. 3D, a client pattern billing Table 4 lists client-to-pattern billing information. Each of the records 88 of Table 4 contains fields for a numerical client ID 90 (see Table I), a numerical pattern ID 92 (see Table 3), and a charge multiplier field 94, which is the ratio to multiply the baseline price per call 72 of Table 1 for charging a client identified by the client ID 90 if a pattern is found in a call which matches a pattern indicated by the pattern ID 92. Table 4 may further include a charge addition field 96 which is fixed additional amount to add to a charge for a call if a pattern indicated by the pattern ID 92; a requirement flag field 98 which indicates if a certain pattern must be matched in order to be billed; and an exclusion field 100 which indicates if a certain pattern must not be matched in order to be billed.

In operation, when a call is received by one of the clients 48a-48n, the patterns extracted by the analysis server 36 are loaded into working memory and referenced by pattern ID 92 for future reference (see Table 3). The analysis server 36 checks Table 4 for a matching billing modifier for adjusting the price of the call to the client 48a-48n based on the presence of at least one of a charge multiplier 94, a charge addition 96, a requirement flag 98, and exclusion 100.

Figure 3E:
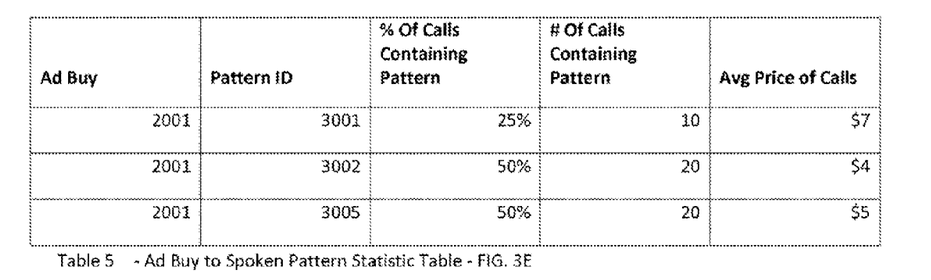

Once calls have been analyzed for patterns, the analysis server 36 may run the matched patterns through an algorithm to further match one or more patterns to a Web site visit and/or an ad buy. Then, the analysis server 36 loops over the ad buys and patterns found in the call from the designated ad buy to derive statistics to be stored in a table, such as the ad buy-to-spoken pattern statistics Table 5 as shown in FIG. 3E. Table 5 includes records 102, each containing a numerical ad buy field 104 (see Table 2), a numerical pattern ID field 106 (see Table 3), the percentage of calls containing the pattern 108, the number of calls containing the pattern 110, and the average price of calls 112 containing the pattern.

Figure 3F:
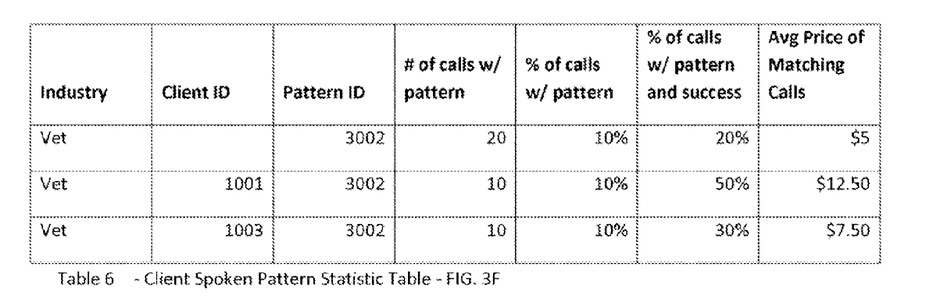

Additionally, once calls have been analyzed for patterns, the patterns for calls may be aggregated by industry, pattern, and client to form a table, such as the client spoken pattern statistics Table 6 as shown in FIG. 3F. Table 6 includes records 114, each containing a client industry field 116, a numerical client 1D field 118, a numerical pattern ID field 120, the number of calls to the client containing the pattern 122, the percentage of calls to this client containing the pattern 124, the percentage of calls to this client containing the pattern that also have a matching success pattern 126, and the average billed price of matching calls 128 to this client that contain this pattern. Embodiments of the present invention may span all clients in an industry as well as excluding certain client IDs.

Figure 3G:
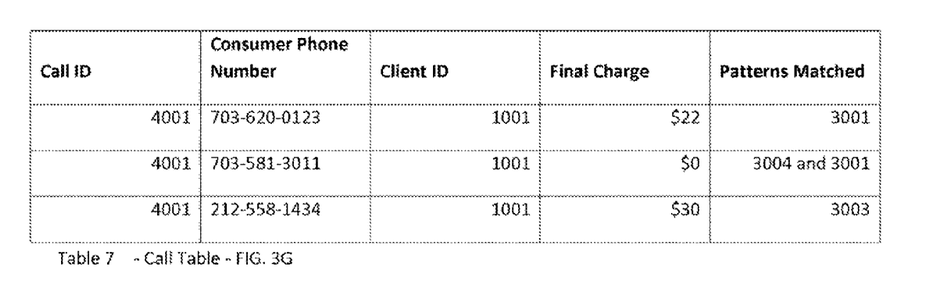

As referenced above, the data store 34 may be populated by the analysis server 36 with a global call Table 7 as shown in FIG. 3G. The call Table 7 may include records 130, each containing a numerical call ID field 132, a consumer phone number field 134, a numerical client ID field 136, a final charge field 138 for a given call, as well as a patterns matched field 140 during the call.

Figure 4:
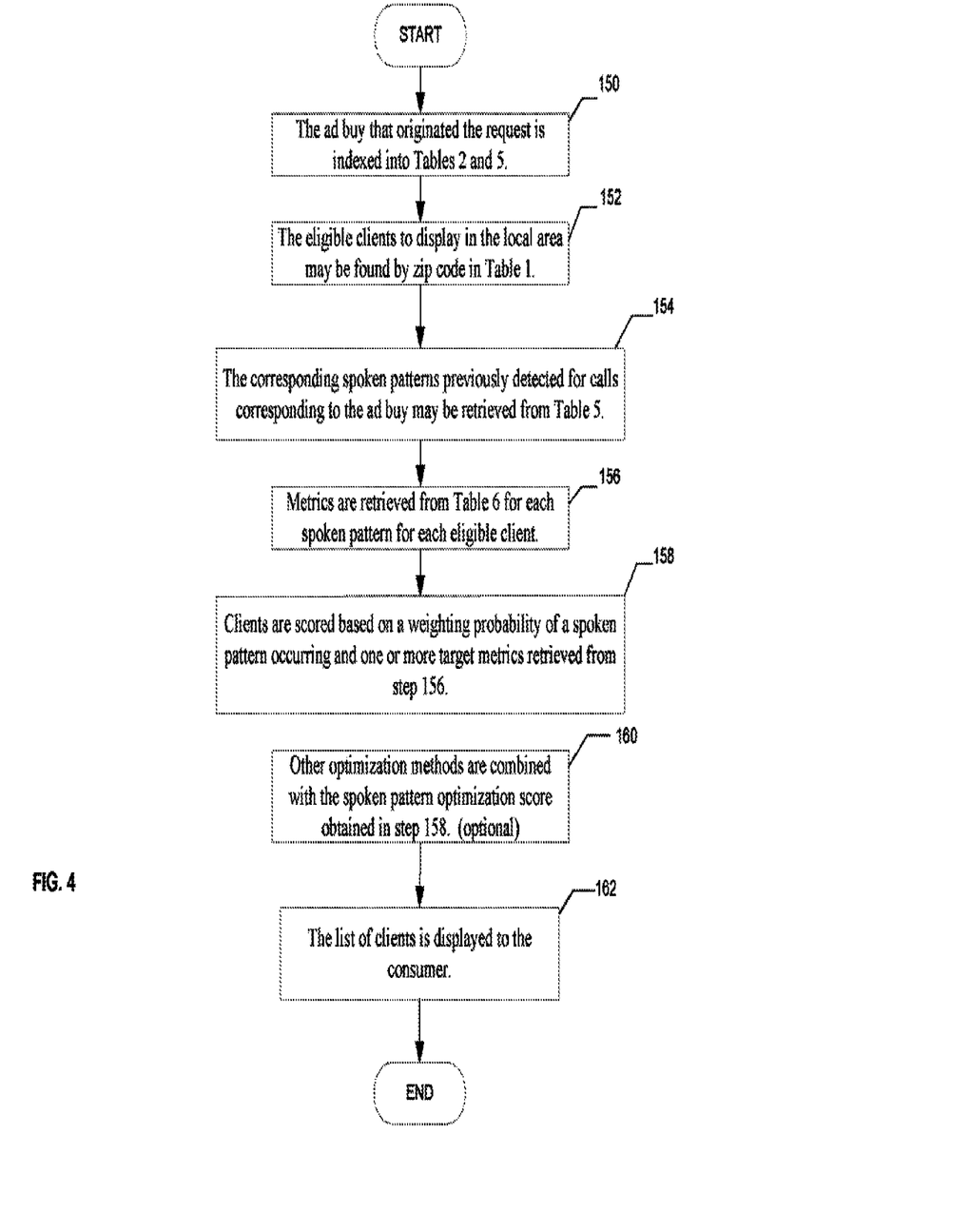
FIG. 4 is a process flow diagram illustrating exemplary steps for execution of a consumer request for a list of clients online, according to an embodiment of the present invention.

FIG. 4 is a process flow diagram illustrating exemplary steps for execution of a consumer request for a list of clients online, according to an embodiment of the present invention. For example, a consumer 42a-42n may request a list of providers (i.e., the clients 48a-48n) within a zip code over the Internet 46. At step 150, the ad buy that originated the request is indexed into Tables 2 and 5. At step 152, the eligible clients to display in the local area may be found by zip code in Table I. At step 154, the corresponding spoken patterns previously detected for calls corresponding to the ad buy may be retrieved from Table 5. At step 156, metrics are retrieved from Table 6 for each spoken pattern for each eligible client. For example, the clients that are in or near the entered zip code may be compared in accordance with their revenue from calls containing the spoken patterns as stored in Table 6. At step 158, clients are scored based on a weighting probability of a spoken pattern occurring and one or more target metrics retrieved from step 156. For example, if the Google "animal boarding" ad buy of Table 2 results in calls that contain patterns relating to pet boarding services, Table 6 may be consulted to find eligible clients that have statistics relating to pet boarding patterns. If one client is more likely to produce a valuable metric (e.g., revenue generated as per the average billed price of matching calls 128 or the percentage of calls to this client containing the pattern that also have a matching success pattern 126), that client may be listed higher in the ad buy according to a weighting that takes into account the probability of occurrence of the spoken pattern during a call from the ad buy. For example, one such scoring algorithm for determining the ordering of search results may be:

Client Ranking Score=Sum of (probability of spoken pattern from this ad buy*revenue extracted from calls with spoken pattern by this client)

In this way, clients that are more likely to monetize relevant spoken patterns for the ad buy will show up higher in the ad buy and receive more telephone calls from consumers. In certain embodiments, the scoring algorithm may be more sophisticated, for example, a learning system that uses revenue and percent of calls that have a pattern match and a success pattern or which mixes these metrics with distance from the consumer.

Returning to FIG. 4, in an optional step 160, other optimization methods are combined with the spoken pattern optimization score obtained in step 158. At step 162, the list of clients is displayed to the consumer.

Figure 5:
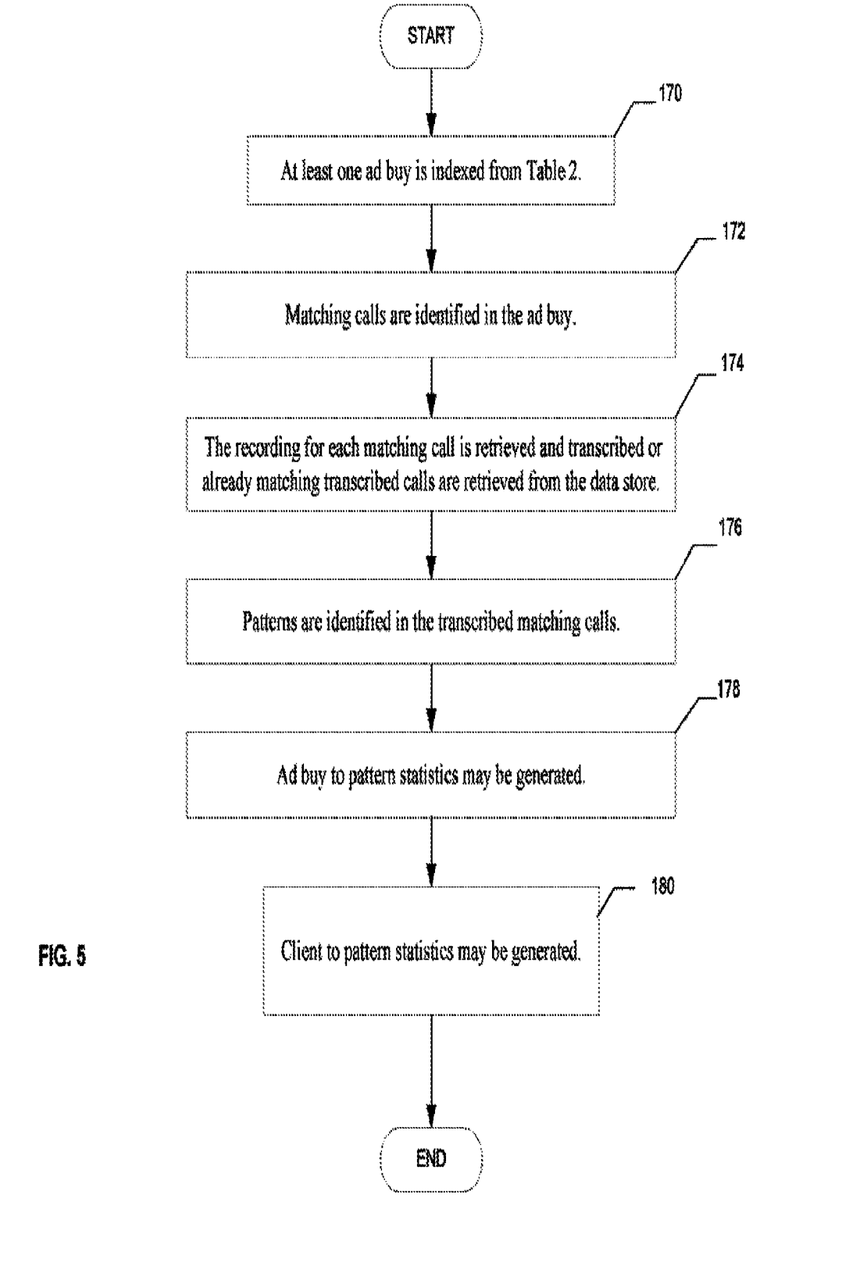
FIG. 5 is a process flow diagram illustrating exemplary steps for performing pattern matching and billing off-line at periodic intervals, instead of on a per call basis, according to an embodiment of the present invention.

FIG. 5 is a process flow diagram illustrating exemplary steps for performing pattern matching and billing off-line at periodic intervals, instead of on a per call basis, according to an embodiment of the present invention. At step 170, at least one ad buy is indexed from Table 2. At step 172, matching calls are identified in the ad buy. At step 174, the recording for each matching call is retrieved and transcribed or already matching transcribed calls are retrieved from the data store 34. At step 176, patterns are identified in the transcribed matching calls. For example, once patterns have been established in Table 3, a loop through transcribed matching calls may be executed to look for the patterns in Table 3. At step 178, ad buy-to-pattern statistics may be generated. For example, the count of matching patterns and derived statistics may be stored in a Table 5. The billing calculation for what to charge a client 48a-48n for a call may be stored in Table 7 according to the client's pattern matching criteria as listed in Table 3. At step 180, client to pattern statistics may be generated. For example, which patterns were matched in a call may be stored in Table 7 for media optimization and may be used to present information to the client 48a-48n in a user interface at the terminal 50a-50n.

Figure 6:
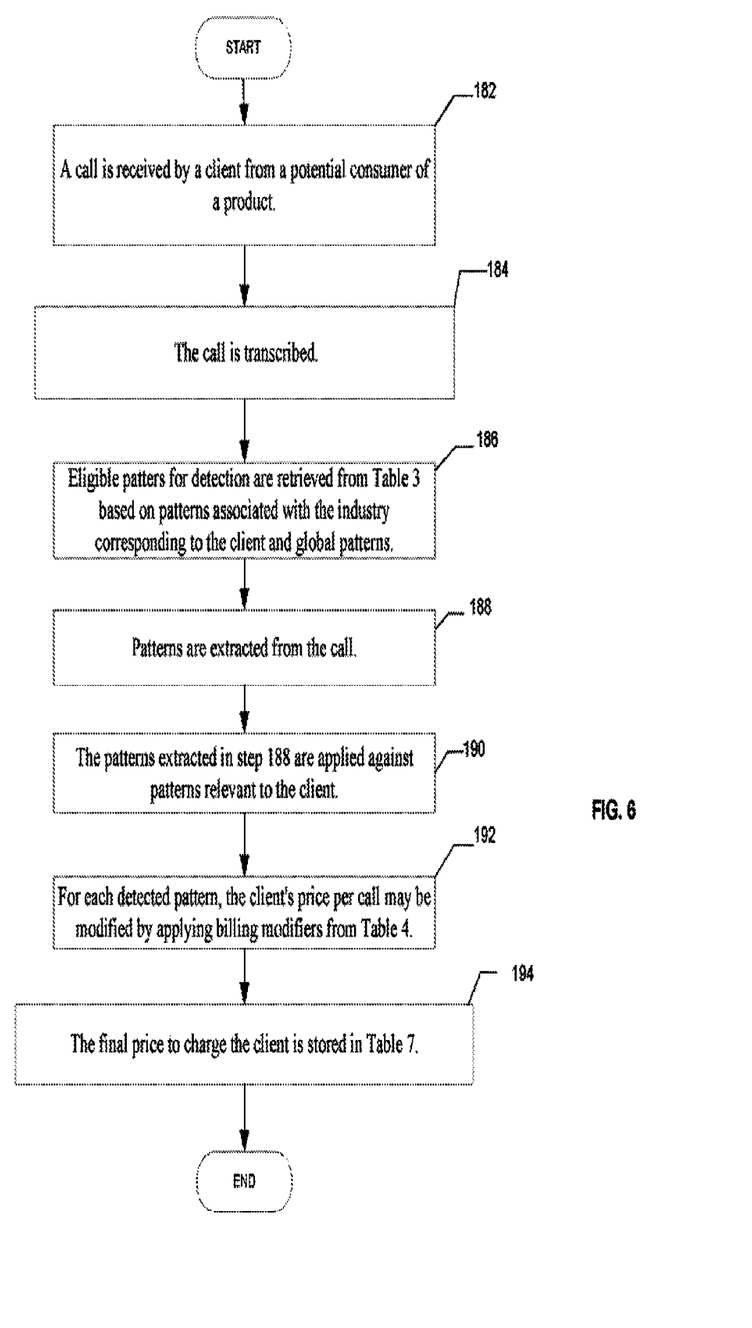
FIG. 6 is a process flow diagram illustrating exemplary steps that may be executed when a call is received by a client from a consumer as described in FIG. 1 in greater detail, according to an embodiment of the present invention.

FIG. 6 is a process flow diagram illustrating exemplary steps that may be executed when a call is received. by a client 48a-48n from a consumer 42a-42n as described in FIG. 1 in greater detail. At step 182, corresponding to step 10 of FIG. 1, a call is received by a client 48a-48n from a potential consumer 42a-42n of a product. At step 184 corresponding to step 12 of FIG. 1, the call is transcribed. Alternatively, the call may be recorded in the data store 34 and later transcribed off line along with the remaining steps of FIG. 6. At step 186, eligible patterns for detection are retrieved from Table 3 based on patterns associated with the industry corresponding to the client 48a-48n and global patterns. At step 188 corresponding to step 14 of FIG. 1, patterns are extracted from the call. At step 190 corresponding to step 16 of FIG. 1, the patterns extracted in 188 are applied against at least one pattern relevant to the client 48a-48n (which may be derived from the success pattern field 86 of Table 3). At step 192 corresponding to step 18 of FIG. 1, for each detected pattern, the client's price per call may be modified by applying billing modifiers (i.e., the charge multiplier field 94 and the charge addition field 96) from Table 4. At step 194, the final price to charge the client 48a-48n is stored in Table 7.

The present invention is subject to variations. The present invention is not restricted to the placement of ad buys on Web pages. Certain embodiments of the present invention are applicable to the more general case of ad buys that are located anywhere a tracked phone number may be placed. For example, ad buys may be placed in text messages on cell phones or inserted into chat streams in an instant messaging service. Even a billboard or non-online media are applicable.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for adjusting advertisement for a client when receiving a call from a consumer, comprising:
maintaining a client table that includes a plurality of clients;
maintaining a pattern table that includes a plurality of patterns, wherein at least a selection of the patterns are marked as relevant to a respective one of the clients in the client table;
receiving a call from a consumer to a destination;
using the destination to find a select client in the client table;
transcribing the call by creating text data representative of voice data collected from the call;
extracting at least one pattern from the text data representative of voice data collected from the call; and
determining whether the at least one pattern from the text data representative of voice data collected from the call matches at least one pattern in the pattern table that is relevant to the select client, wherein a placement and prominence of an information pertaining to a client on a Web page is made more visible to the consumer viewing the information based on the at least one pattern relevant to the client.

2. The method of claim 1, further comprising:
adjusting a price of the call to the select client based on the at least one pattern relevant to the select client as determined from the text data representative of voice data collected from the call.

3. The method of claim 2, wherein adjusting the price of the call is further based on the client's willingness to pay for a call based on the at least one pattern relevant to the client.

4. The method of claim 2, further comprising:
maintaining a client pattern calling table containing a plurality of clients and a plurality of patterns matched in pairs to one another and a respective charge modifier associated with each pair, wherein the price of a call is adjusted by means of the charge modifier and the charge modifier is at least one of a multiplication factor and a flat rate additional charge.

5. The method of claim 1, wherein the at least one pattern relevant to the client is tied to the client's business goals.

6. The method of claim 3, wherein the at least one pattern relevant to the client is based on successful business transactions between the consumer and the client.

7. The method of claim 3, wherein the at least one pattern relevant to the client is based on an inquiry into a service provided by the client.

8. The method of claim 1, wherein the placement is further based on the value of the at least one pattern relevant to the client to the client's business goals.

9. The method of claim 1, wherein the at least one pattern relevant to the client is one of common to all calls, common to the type of service of the client, and customized to a particular client.

10. The method of claim 8, wherein the at least one pattern is represented by at least one of a text strings, a regular expression, and the result of analysis of the context of the at least one pattern relevant to the client in the transcribed call.

11. The method of claim 1, wherein the at least one pattern relevant to the client is extracted using term frequency analysis in an off-line learning step.

12. The method of claim 1, wherein the information pertaining to the client in an ad buy is listed higher in the ad buy according to a weighting that takes into account the probability of occurrence of the at least one pattern relevant to the client having been spoken during a call.

13. The method of claim 12, wherein ordering of a display of client in an ad buy is determined by a scoring algorithm.

14. The method of claim 13, wherein the scoring algorithm conforms to the equation:

Client Ranking Score=Sum of (probability of spoken pattern from the ad buy*revenue extracted from calls with spoken pattern by the client) for all patterns during the call.

15. The method of claim 13, wherein the scoring algorithm is based on a learning system that uses revenue and percent of calls that have a pattern match or which mixes a pattern match with distance from the consumer.

16. The method of claim 1, wherein the step of applying the at least one pattern from the transcribed call against at least one pattern relevant to the client triggers the purchase of at least one ad buy for the client.

17. The method of claim 16, wherein the at least one ad buy is located wherever a tracked telephone number is placed.

18. The method of claim 17, wherein the at least one ad buy is placed on at least one of a Web page, a text messages on a cell phone, a portion of a chat streams in an instant messaging service, and non-online media.

19. The method of claim 1, wherein the at least one pattern relevant to the client is extracted using term frequency analysis in an off-line learning step.

20. The method of claim 1, further comprising the step of receiving at least one success pattern, wherein the at least one success pattern triggers the purchase of at least one ad buy for the client.

21. The method of claim 20, wherein the at least one ad buy is located wherever a tracked telephone number is placed.

22. A system for automatically adjusting advertisement for a client when receiving a call from a consumer, comprising:
a telephony server configured for extracting the identity of a caller from a call received by the client; and
a data store;
a client table that includes a plurality of clients in the data store;
a pattern table that includes a plurality of patterns in the data store, wherein at least a selection of the patterns are marked as relevant to a respective one of the clients in the client table;
an analysis server configured for:
receiving a call from a consumer to a destination;
using the destination to find a select client in the client table;
transcribing the call by creating text data representative of voice data collected from the call;
extracting at least one pattern from the text data representative of voice data collected from the call; and
determining whether the at least one pattern from the text data representative of voice data collected from the call matches at least one pattern in the pattern table that is relevant to the select client, wherein a placement and prominence of an information pertaining to a client on a Web page is made more visible to the consumer viewing the information based on the at least one pattern relevant to the client.

* * * * *